US007684985B2

United States Patent
Dominach et al.

(10) Patent No.: US 7,684,985 B2
(45) Date of Patent: Mar. 23, 2010

(54) TECHNIQUES FOR DISAMBIGUATING SPEECH INPUT USING MULTIMODAL INTERFACES

(76) Inventors: Richard Dominach, 12 English La., Lincroft, NJ (US) 07738; Sastry Isukapalli, 1275 Rock Ave., North Plainfield, NJ (US) 07060; Sandeep Sibal, C-1501, Chaitanya Towers, Prabha Devi, Mumbai-400025 (IN); Shirish Vaidya, 13106 Pelmira Ridge Ct., Herndon, VA (US) 20171

( * ) Notice: Subject to any disclaimer, the term of this patent is extended or adjusted under 35 U.S.C. 154(b) by 910 days.

(21) Appl. No.: 10/733,793

(22) Filed: Dec. 10, 2003

(65) Prior Publication Data

US 2004/0172258 A1     Sep. 2, 2004

Related U.S. Application Data

(60) Provisional application No. 60/432,227, filed on Dec. 10, 2002.

(51) Int. Cl.
    *G06F 17/27* (2006.01)
    *G10L 15/00* (2006.01)
    *G10L 15/26* (2006.01)
    *G10L 17/00* (2006.01)

(52) U.S. Cl. .......................... 704/235; 704/9; 704/251; 704/270

(58) Field of Classification Search .................. 704/235
    See application file for complete search history.

(56) References Cited

U.S. PATENT DOCUMENTS

| 5,265,014 | A | * | 11/1993 | Haddock et al. | 704/9 |
| 5,321,608 | A | * | 6/1994 | Namba et al. | 704/9 |
| 5,424,947 | A | * | 6/1995 | Nagao et al. | 704/9 |
| 5,477,451 | A | * | 12/1995 | Brown et al. | 704/9 |
| 5,712,957 | A | | 1/1998 | Waibel et al. | 395/2.49 |
| 5,917,890 | A | | 6/1999 | Brotman et al. | 379/88.01 |
| 5,960,447 | A | * | 9/1999 | Holt et al. | 715/500 |
| 5,974,413 | A | * | 10/1999 | Beauregard et al. | 707/6 |
| 6,006,183 | A | * | 12/1999 | Lai et al. | 704/235 |
| 6,223,150 | B1 | * | 4/2001 | Duan et al. | 704/9 |
| 6,539,348 | B1 | * | 3/2003 | Bond et al. | 704/9 |
| 6,633,846 | B1 | * | 10/2003 | Bennett et al. | 704/257 |

* cited by examiner

*Primary Examiner*—David R Hudspeth
*Assistant Examiner*—Justin W Rider
(74) *Attorney, Agent, or Firm*—Ash Tankha

(57) ABSTRACT

A technique is disclosed for disambiguating speech input for multimodal systems by using a combination of speech and visual I/O interfaces. When the user's speech input is not recognized with sufficiently high confidence, a the user is presented with a set of possible matches using a visual display and/or speech output. The user then selects the intended input from the list of matches via one or more available input mechanisms (e.g., stylus, buttons, keyboard, mouse, or speech input). These techniques involve the combined use of speech and visual interfaces to correctly identify user's speech input. The techniques disclosed herein may be utilized in computer devices such as PDAs, cellphones, desktop and laptop computers, tablet PCs, etc.

14 Claims, 2 Drawing Sheets

TECHNIQUES FOR DISAMBIGUATING SPEECH INPUT USING MULTIMODAL INTERFACES

CROSS-REFERENCE TO RELATED CASES

This application claims the benefit of U.S. Provisional Application No. 60/432,227, entitled "Techniques for Disambiguating Speech Input Using Multimodal Interfaces," filed on Dec. 10, 2002.

FIELD OF THE INVENTION

The present invention relates generally to the field of multimodal computing (and other electronic) devices, and, more particularly, to techniques for disambiguating speech input using multimodal interfaces.

BACKGROUND OF THE INVENTION

An increasing number of software and hardware based computer systems are using Automatic Speech Recognition (ASR) technology to allow a user to navigate through and control a wide variety of applications via speech input. ASR systems recognize speech input, and map user utterance to tokens based on a grammar that defines allowable speech inputs and rules for interpreting the speech. These tokens can then be processed by an application program.

ASR technology is powerful, but not fool-proof. That is, ASR systems do not always correctly recognize the user's utterance. This can occur due to a variety of factors including noisy environments, the speaker's accent and mispronunciation, microphone quality, etc.

ASR systems function by matching the user's utterance against a grammar that defines the allowable words and phrases. The result of the ASR processing is a one or more matching tokens, each with a corresponding measure of confidence that the user's utterance matches the text token. The presence of more than one matching token indicates that there is no clear best match to the user's speech. We refer to the process of accurately determining the user's intent using the list of returned matches (and the corresponding confidence values) as "disambiguation."

Current voice based disambiguation mechanisms suffer from many limitations. Often the user is asked to repeat his utterance, which may lead to the same un-matched result. Sometimes, the list of alternatives is spoken back to the user using Text-to-Speech (TTS) technology. This is slow, and with poor TTS quality, the user may misinterpret the alternatives. This often results in user frustration, and is a slow and cumbersome process especially when the ASR engine is remote to the user (as is often the case with mobile scenarios).

Multimodal interfaces represent a new technology that facilitates the use of multiple modalities (or modes) to interact with an application. Multi-modal interfaces are potentially useful in improving the disambiguating of speech and substantially improving end user experience.

In view of the foregoing, there is a need for a system that overcomes the drawbacks of the prior art.

SUMMARY OF THE INVENTION

The present invention provides a Multimodal Disambiguation Mechanism (MDM), and particular multimodal techniques to improve the speech recognition process. This mechanism can be applied to many types of applications, software and hardware architectures, device types, and network technologies.

A system according to the invention preferably includes one or more of the following components: user input and/or output devices with various modes; a speech recognition engine; and an application that uses the results of the speech recognition engine; and a multi-modal disambiguation engine. Preferably the different modes of input/output devices include visual and voice modes. Visual mode may use devices such as a visual display, stylus, pen, buttons, keyboard, touch pad, touch screen, mouse, etc. Voice mode may use devices such as a microphone (with an optional push-to-talk button), speakers, headphones, speakerphone, etc.

The speech recognition engine may use a grammar or rules to interpret speech input, and may generate tokens based on the speech input (although speech recognition systems based on other mechanisms may be used—the use of any speech recognition mechanism is within the spirit and scope of the invention). The multi-modal disambiguation engine receives the results from the speech recognition engine and performs disambiguation tasks. A token representing the disambiguated speech input is then provided to the application.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
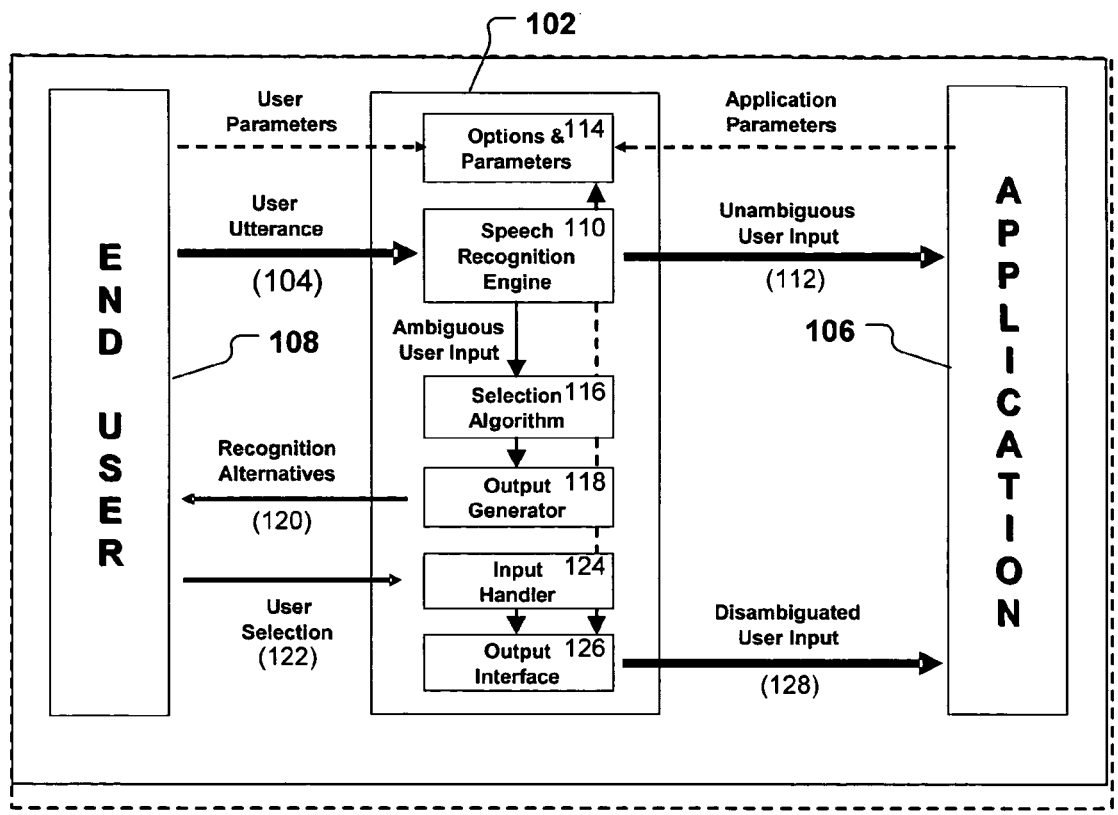
FIG. 1 is a functional block diagram of an example multimodal disambiguation mechanism in accordance with aspects of the invention, and further shows a method of disambiguating speech.

FIG. 1 shows an overview of an example multi-modal disambiguation mechanism (MDM) 102 in accordance with the invention, and demonstrates a context in which an MDM 102 may be used. The MDM 102 shown in FIG. 1 is used to disambiguate an end user's spoken utterances 104 so that the data represented by those utterances 104 may be used as input to application programs 106.

In the scenario, the end user 108 uses a speech interface to issue commands to the application 106. The user's utterances 104 (e.g., spoken words) are input to a speech recognition engine 110 (SRE). If the SRE recognizes the utterance with sufficient confidence (based on the settings of the SRE and the application), the result corresponding to this "unambiguous user input" 112 is sent to the application 106. In the event that the SRE 110 does not recognize the user's utterance 104 with high enough confidence, the multimodal disambiguation mechanism 102 is triggered to disambiguate the user's utterances 104 and pass the result on to the application 106. MDM 102 may disambiguate speech based on a set of parameters 114 that have been configured by a user or administrator In case no user and application options and parameters 114 are set, the MDM may use a set of default parameters.

In the event of an unmatched utterance, the selection algorithm 116 (SA) receives as input the set of alternatives that SRE 110 believes are the best match to the user's utterance. The SA 116 filters this set according to the options and parameters 114 (or a set of default parameters) and passes the result on to output generator 118. Output generator 118 preferably presents to the user a multimodal disambiguation panel, which renders a set of recognition alternatives 120, and the user 108 may use the panel to select the correct alternative. The user's selection 122 is received by input handler 124, which then passes the selected alternative to the output interface 126. The user's selection constitutes disambiguated input 128, which is then sent to application 106. The above-described process generally takes place transparently, in the sense that application 106 is generally unaware that the disambiguation process has taken place.

The following sections describe each of the components of the MDM in greater detail, providing exemplary specifications and requirements for their operation.

End user 108. End user 108 accesses MDM 102 and application 106 via an end user device which has multimodal input and output capabilities. A non-exhaustive list of example devices includes the following: mobile phones; PDA's; and handheld, desktop and laptop computers. MDM 102 and application 106 may reside on the end user device and/or may be available as a distributed service on other computer servers or workstations. MDM software on the end user device has the capability to enter, edit, and store the end user parameters 114, which govern the operations of MDM 102. The end user device has various multimodal input and output capabilities that may vary by the type of device. These capabilities are used by the MDM 102 software to present to the end user the recognition alternatives 120, and to accept and interpret the user selection input. Various types of input can be accepted including speech input, keypad input, stylus input, touch input, based on the end user device capabilities.

Applications 106. The application can be any speech assisted application, or an application that accepts traditional text or event input. The application (or subcomponents of it) can be resident on the end user device and/or distributed across the end user device and other remote servers. The disambiguation mechanism can be entirely transparent to the user or portions of the MDM 102 can be implemented within the application 106. Applications 106 can be written in various languages to use the MDM 102. The application— through its configuration parameters—can control the disambiguation mechanism.

Multimodal Disambiguation Mechanism (MDM) 102. A function of MDM 102 is to disambiguate the user's utterances 104 in the event that these utterances 104 are not recognized with sufficient confidence. The SRE 110 can be configured to return a set of alternatives 120 that the user's utterance 104 matches. The MDM 102 uses these alternatives 120 and the corresponding confidence levels to disambiguate the user's utterance 104. The output of the disambiguation process (i.e., the disambiguated user input) is sent to the application 106. The MDM 102 can be guided and controlled by user and application parameters 114.

The MDM comprises multiple components (e.g., components 110, 114, 116, 118, 124, and 126) that can be resident on the end user device or can be distributed on other computers on a network. Portions of the MDM 102 can be resident in the application 104. The components of the MDM 102 are described below.

Options and Parameters 114. The end user 108 and the application 106 can both set parameters 114 to control the various sub-components of the MDM. Among other things, the MDM combines the end user and application parameters to drive the MDM process.

Speech Recognition Engine (SRE) 110. The SRE 110 takes as input the user utterance 104, a grammar to be matched against the utterance 104, and a set of parameters 114, such as the confidence thresholds governing unambiguous recognition and inclusion of close matches. If the utterance matches a token in the grammar with a confidence higher than the threshold for unambiguous recognition, the recognized utterance 104 is passed to the application. Otherwise, a set of alternatives with their confidence values is passed to the selection algorithm 116 to begin the disambiguation process. Preferably, any SRE 110 supporting automatic speech recognition that returns a list of alternatives with confidence values can be used.

Selection algorithm (SA) 116. The selection algorithm 106 is invoked when the user's utterance is recognized with accuracy below the confidence threshold for unambiguous recognition. The SA 116 calculates the alternatives to be passed to the user based on the individual confidence values, application and user parameters, though other factors may also be involved in determining the alternatives.

Output generator (OG) 118. The output generator 118 takes as input the alternatives calculated by the SA 116, and presents these to the end user who will select one alternative to be returned to the application. User and application parameters control the presentation to the user and the user disambiguation method (UDM) to be used. UDM's are of three overall classes: visual only, voice only, and multimodal. Within these classes, there are multiple types of UDM's that can be used.

Input Handler (IH) 124. Once the multimodal disambiguation panel is presented to the user, the user will take an input action to choose one of the selections. The input action can be multimodal, i.e. the user can take voice or visual action, or perhaps a combination of the two. The IH 124 will handle this multimodal user selection and determine which alternative has been selected by the user. Allowable user actions are based on the types of UDM's used. A combination of multimodal UDM's can be utilized. It should be noted that it may be particularly useful to allow the user to interact with the alternatives in plural modes (e.g., visual and voice modes).

Output Interface (OI). Once the user 108 has selected one of the alternatives 120, the selected alternative will be passed to the application 106 as the Disambiguated User Input 128. The interaction will continue as if the selected alternative was originally recognized by the speech recognizer.

Figure 2:
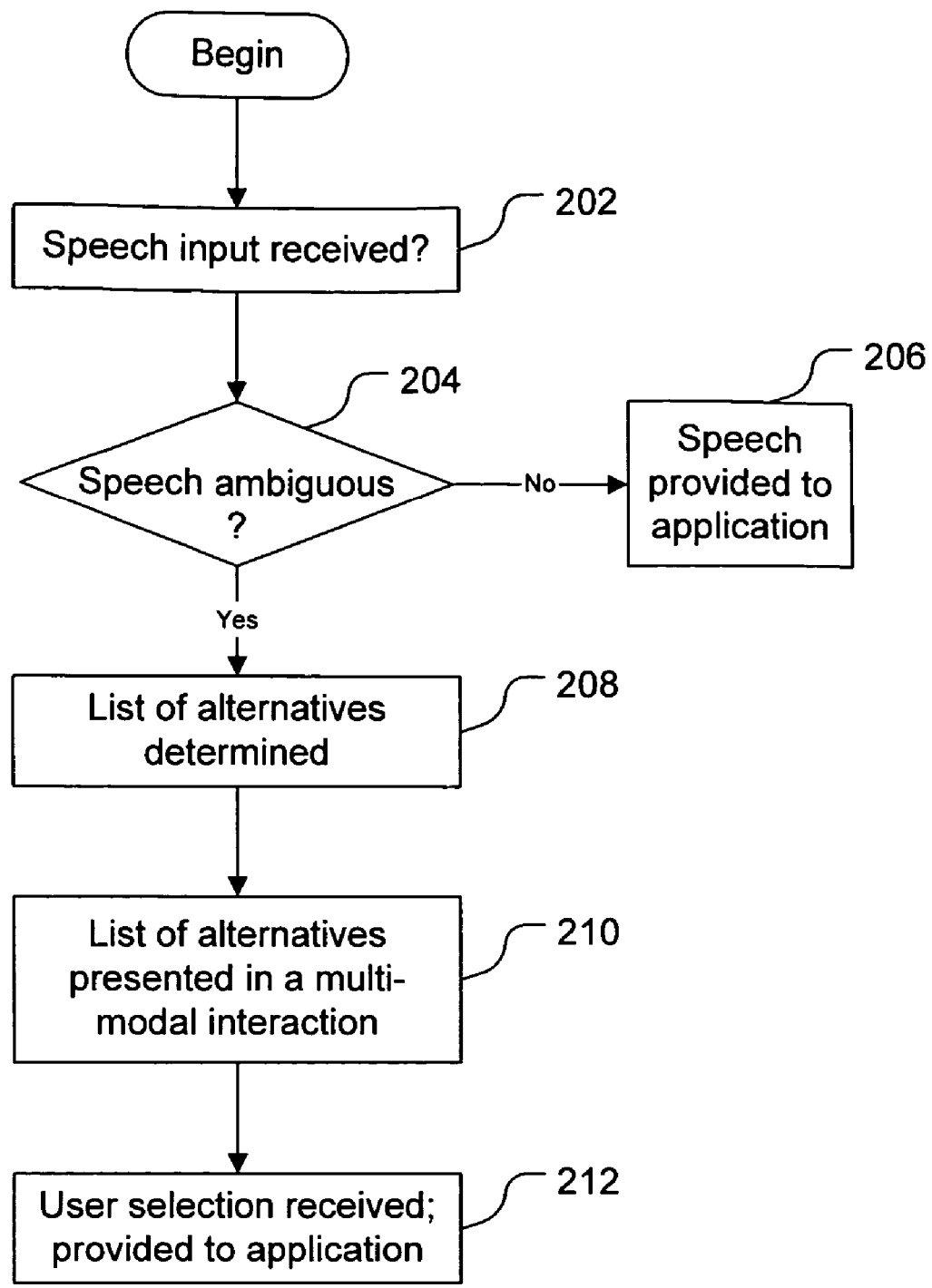
FIG. 2 is a flow diagram of an example process for disambiguating speech.

FIG. 2 shows an example process of disambiguating speech in the form of a flow diagram. Initially, speech input is received (202)— e.g., by a user speaking into a microphone. A speech recognition engine then attempts to recognize the speech. If the speech is recognized unambiguously (204), then the unambiguous speech is provided as input to an application (206). If, however, the speech is not recognized unambiguously, then a list of possible alternatives is determined (208). The list of alternatives may, for example, be the set of possible tokens identified by the speech recognition engine whose confidence value exceeds some defined threshold. The list of alternatives may also be filtered according to a set of parameters. The list of alternatives is presented to a user in a multi-modal interaction (210). The user then selects one of the alternatives, and the selected alternative is provided to the application as input (212).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system for disambiguating speech input using one of voice mode interaction, visual mode interaction, or a combination of voice mode interaction and visual mode interaction with an application comprising:
    a speech disambiguation mechanism resident on one of an end user device and a remote server, and accessed through said end user device possessing multimodal user interfaces, said speech disambiguation mechanism comprising:
        an options and parameters component for receiving and storing user parameters and receiving application parameters for controlling the speech disambiguation mechanism, wherein the speech disambiguation mechanism is controlled by parameters set by the user and parameters set by the application, and wherein the parameters include confidence thresholds governing unambiguous recognition and close matches;
        a speech recognition component that receives recorded audio, speech input or a combination of the recorded audio and the speech input through one of said multimodal user interfaces, and generates:
            a plurality of tokens corresponding to disambiguated words for presentation to the user; and
            for each of the one or more tokens, a confidence value indicative of the likelihood that a given token correctly represents the speech input;
        a selection component that identifies, according to a selection algorithm, two or more of the tokens to be presented to the user;
        one or more disambiguation components directing one or more of said multimodal user interfaces to present the alternatives to the user in one of voice mode, visual mode, or a combination of the voice mode and the visual mode, and directing the multimodal user interfaces to receive an alternative selected by the user in one of the voice mode, the visual mode, or a combination of the voice mode and the visual mode; and
        an output interface for communicating the selected alternative without translation of the speech input to the application as input.

2. The system of claim 1, wherein the one or more disambiguation components perform said interaction by presenting the user with alternatives in a visual mode, and by receiving the user's selection in a visual mode.

3. The system of claim 2, wherein the disambiguation components present the alternatives to the user in a visual form and allow the user to select from among the alternatives using a voice input.

4. The system of claim 1, wherein the selection component filters the one or more tokens according to a set of parameters.

5. The system of claim 4, wherein the set of parameters is user specified.

6. A method of processing speech input using one of voice mode interaction, visual mode interaction, or a combination of voice mode and visual mode interaction with an application comprising:
    a speech disambiguation mechanism, wherein said speech disambiguation mechanism is resident on one of an end user device and a remote server, and accessed through said end user device possessing multimodal user interfaces;
    receiving and storing user parameters and receiving application parameters for controlling the speech disambiguation mechanism, wherein both the user and the application can set the parameters to control said speech disambiguation mechanism, and wherein the parameters include confidence thresholds governing unambiguous recognition and close matches;
    receiving a speech input from the user through one of said multimodal user interfaces;
    determining whether the speech input is ambiguous;
    if the speech input is not ambiguous, communicating a token representative of the speech input to the application as input to the application; and
    if the speech input is ambiguous;
        selecting two or more tokens and presenting the tokens as alternatives to the user;
        directing the multimodal user interfaces to present the alternatives to the user in one of voice mode, visual mode, or a combination of the voice mode and the visual mode, and to present a selection of an alternative from the user from the plurality of alternatives presented to the user in one of the voice mode, the visual mode, or a combination of the voice mode and the visual mode; and
        communicating the selected alternative without translation of the speech input as input to the application.

7. The method of claim 6, where the interaction comprises the concurrent use of said visual mode and said voice mode.

8. The method of claim 7, wherein the interaction comprises the user selecting from among the plural alternatives using a combination of speech and visual-based input.

9. The method of claim 6, wherein the interaction comprises the user selecting from among the plural alternatives using visual input.

10. The system of claim 1 further comprises a communication network, wherein the options and parameters component, the speech recognition component, the selection component, the one or more disambiguation components, and the output interface of the speech disambiguation mechanism are distributed on said communication network.

11. A method of processing speech input using one of voice mode interaction, visual mode interaction, or a combination of voice mode and visual mode interaction with an application comprising:
    a speech disambiguation mechanism, wherein said speech disambiguation mechanism is resident on a remote server, and accessed over a communication network using an end user device possessing multimodal user interfaces;
    receiving and storing user parameters and receiving application parameters for controlling the speech disambiguation mechanism, wherein both the user and the application set the parameters to control said speech disambiguation mechanism, and wherein the parameters include confidence thresholds governing unambiguous recognition and close matches;
    receiving a speech input from the user through one of said multimodal user interfaces;

determining whether the speech input is ambiguous;
if the speech input is not ambiguous, communicating a token representative of the speech input to the application as input to the application; and
if the speech input is ambiguous;
  selecting two or more tokens and presenting the tokens as alternatives to the user;
  directing the multimodal user interfaces to present the alternatives to the user in one of voice mode, visual mode, or a combination of the voice mode and the visual mode, and to present a selection of an alternative from the user from the plurality of alternatives presented to the user in one of the voice mode, the visual mode, or a combination of the voice mode and the visual mode; and
  communicating the selected alternative without translation of the speech input as input to the application.

12. The method of claim 11, where the interaction comprises the concurrent use of said visual mode and said voice mode.

13. The method of claim 12, wherein the interaction comprises the user selecting from among the plural alternatives using a combination of speech and visual-based input.

14. The method of claim 11, wherein the interaction comprises the user selecting from among the plural alternatives using visual input.

* * * * *